June 5, 1923.
R. W. VAN NORDEN
ELECTROMAGNETIC APPARATUS
Filed Jan. 28, 1920
1,457,475
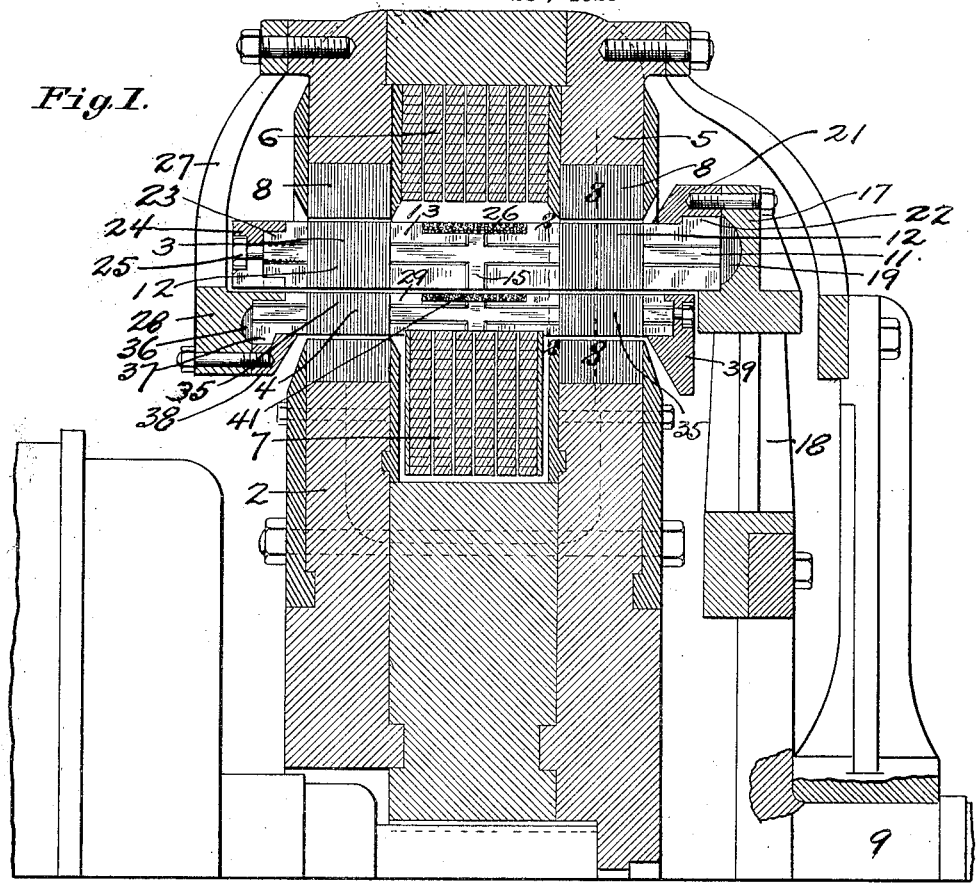
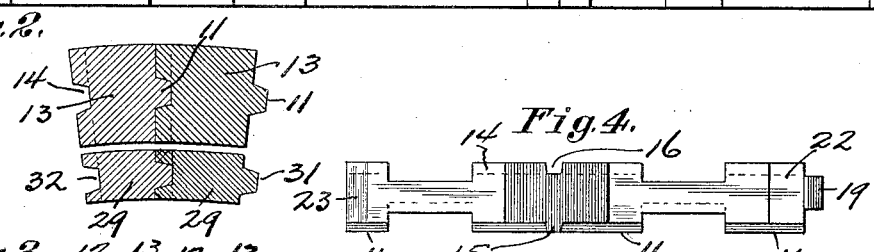
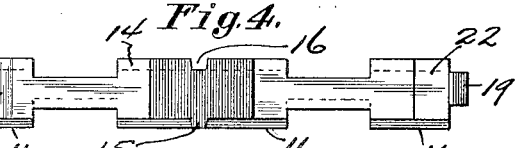
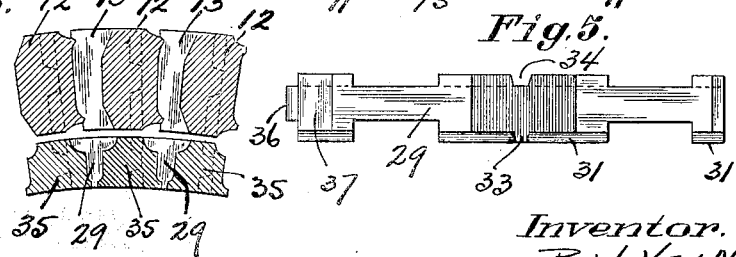
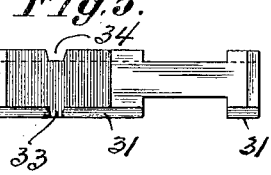
Inventor.
R. W. Van Norden
By White & Prest
his Attorneys.

Patented June 5, 1923.

1,457,475

UNITED STATES PATENT OFFICE.

RUDOLPH W. VAN NORDEN, OF SAN FRANCISCO, CALIFORNIA.

ELECTROMAGNETIC APPARATUS.

Application filed January 28, 1920. Serial No. 354,566.

*To all whom it may concern:*

Be it known that I, RUDOLPH W. VAN NORDEN, a citizen of the United States, and a resident of the city and county of San Francisco and State of California, have invented a certain new and useful Electromagnetic Apparatus, of which the following is a specification.

The invention relates to electro-magnetic apparatus in which magnetic conductors in the form of isolated segments requiring mechanical means of support are employed. Machines of the type to which the present invention is applicable, are shown in United States Letters Patent Nos. 1,171,134 and 1,227,185 and in my co-pending application Serial No. 260,223, filed in the Patent Office on October 30, 1918, but it is to be understood that the invention is not limited to machines of such type, but is broadly applicable to motors, generators, power transmission apparatus and other electric and magnetic machinery.

An object of the invention is to provide supporting means for isolated magnetic segments which minimizes losses due to localized circulating or eddy currents.

Another object of the invention is to provide supporting members of dielectric material constructed and arranged to withstand the strains placed thereon.

The invention possesses other advantageous features, some of which, with the foregoing, will be set forth at length in the following description, where I shall outline in full, that form of the invention which I have selected for illustration in the drawings accompanying and forming part of the present specification. In said drawings I have shown one embodiment of my invention, but it is to be understood that I do not limit myself to such form, since the invention, as expressed in the claims, may be embodied in a plurality of forms.

Referring to said drawings:

Figure 1 is a vertical longitudinal section through one-half of an electro-magnetic machine and embodying my invention.

Figure 2 is a cross section taken on the line 2—2, Figure 1.

Figure 3 is a cross section taken on the line 3—3 Figure 1.

Figure 4 is a plan or top view of one of the magnetic segment supporting bars of the rotor.

Figure 5 is a plan or top view of one of the magnetic segment supporting bars of the stator.

The machine shown in Fig. 1, which is one form of machine to which the present invention is applicable, is an electro-magnetic power transmission apparatus for reducing mechanical revolving motion from one speed to another. This machine includes a high speed rotor 2 driven by a steam turbine, or other source of power, a low speed rotor 3 connected to the driven shaft and a stator, the two rotors and the stator being coupled by a magnetic flux. In the preferred construction, the stator is divided into two parts, spaced apart radially and comprising an inner ring-shaped stator 4 arranged between the two rotors, and an outer stator surrounding the low speed rotor. An exciting coil 6 is arranged on the outer stator and an exciting coil 7 is arranged on the inner stator, but in some instances, the coil 7 may be dispensed with.

The outer stator 5 is provided with two series of regularly spaced circumferentially disposed laminated teeth 8. Arranged within the outer stator is the driven rotor 3 which is secured to the driven shaft 9. The rotor 3 comprises two circumferentially disposed series of regularly spaced laminated magnetic segments 12, spaced and held by bars of non-magnetic and dielectric material, such as bakelite or other fibrous, natural or manufactured product. The bars 13 are arranged circumferentially and are disposed parallel to the axis of the rotor. The bars, except where they receive the magnetic segments 12, are provided with radial contacting sides, so that when the bars are arranged contiguously, they form a ring, like the staves of a barrel. In a machine, such as disclosed in Fig. 1, in which two series of magnetic segments are arranged on the rotor, the side faces of the bars are in contact between the two series of segments. The bars are preferably keyed together against radial displacement by a longitudinal rib 11 on one side of the bar engaging in a longitudinal groove 14 in the adjacent side of the contiguous bar, that is each bar is provided with a longitudinal rib on one side and a corresponding longitudinal groove on the other side. Longitudinal displacement of the bars is similarly avoided by the engagement of a radial rib 15 on one side of each bar engaging a radial groove 16 in the adjacent side of a contiguous bar. When the magnetic segments 12 are arranged, the bars are suitably shaped on the side faces to receive and hold between them, the segments. The rotor bars 13 when assembled form a ring or drum which is supported on the circumferential ring 17 of the bronze spider 18. The bars are formed on one end with tongues or ribs 19 which seat in corresponding depressions in the ring 17, so that torque set up in the bar-drum will be transmitted to the ring 17 without slippage. The bars are held to the ring by a bronze clamp collar 21 secured to the ring and engaging transverse projections or ribs 22 on the upper surfaces of the bars at the end. The bars extend beyond the laminated segments on both sides so that they may be properly secured to the rings. At their other ends the bars are provided with heads 23 which seat in a groove in the bronze ring 24, to which they are held by bolts 25. When desired, the bars may be further held in place by a surrounding clamping band 26, preferably formed of bronze wire and seating in a circumferential groove in the bar-drum.

The inner stator 4 is supported from the outer stator 5 by the ribs 27, preferably formed integral with the bronze stator supporting ring 28. The stator bars 29 are of non-magnetic dielectric material and are shaped similarly to the rotor bars, being so formed that when assembled they form a stator drum with the adjacent faces of the bars in contact, as the staves in a barrel. The stator bars are provided with longitudinal ribs and grooves 31—32 and with radial ribs and grooves 33—34, for the same reason as the rotor bars and the side faces of the bars are formed to receive and clamp between them, the laminated stator magnetic segments 35. The stator bars are similarly provided on their ends with tongues 36 seating in corresponding radial grooves in the ring 28 and are provided with projections 37 which are engaged by the clamp collar 38. The free ends of the bars seat in the bronze ring 39 and a surrounding clamping band 41 may be employed to reinforce the bar-drum.

By virtue of this construction, the magnetic segments, both in the rotor and stator, are held by non-magnetic dielectric materials, so that all eddy current losses in the stator and rotor are eliminated. This provides a drum stator and a drum rotor of non-magnetic dielectric material in which the magnetic segments are embedded in the material and firmly held against the forces to which they are subjected.

I claim:

1. In an electro-magnetic machine, a drum comprising a plurality of contiguous bars of non-magnetic dielectric material, and magnetic segments disposed between portions of the bars.

2. In an electro-magnetic machine, a drum comprising a plurality of bars of non-magnetic dielectric material arranged with their side faces in contact, a ring in which the ends of said bars are held, said bars being reduced in width at a portion thereof and magnetic segments arranged between the bars at the reduced width portions.

3. In an electro-magnetic machine, a drum comprising a plurality of circumferentially disposed parallel contiguous bars of non-magnetic dielectric material and magnetic segments keyed in said drum between the bars.

4. In an electro-magnetic machine, a drum comprising a circumferential series of parallel contiguous bars of non-magnetic dielectric material, a ring in which the ends of the bars are mounted and magnetic segments seated in the drum between the bars.

5. In an electro-magnetic machine, a drum comprising a circumferential series of parallel contiguous bars of non-magnetic dielectric material, said bars being reduced in width at corresponding portions to form a circumferential series of pockets between the bars, and magnetic segments seated in said pockets.

6. In an electro-magnetic machine, a drum comprising a circumferential series of contiguous bars of non-magnetic dielectric material, each bar being provided on one side face with a longitudinal rib and on the other side face with a corresponding groove so that the rib of one bar seats in the slot of the groove of the contiguous bar.

7. In an electro-magnetic machine, a drum comprising a circumferential series of contiguous bars of non-magnetic dielectric material, a radial rib on one side of each bar and a corresponding radial groove on the other side of each bar so that a rib of one bar seats in the groove in the contiguous bar.

8. In an electro-magnetic machine, a drum comprising a circumferential series of bars of none-magnetic dielectric material, each bar having side faces adapted to contact with the side faces of the contiguous bars, and means on said side faces for locking the bars together against radial movement.

9. In an electro-magnetic machine, a drum comprising a circumferential series of bars of non-magnetic dielectric material, each bar having side faces adapted to contact with the side faces of the contiguous bars and each bar having a portion of each side face depressed to form a circumferential series of pockets in the drum and magnetic segments seated in said pockets.

10. In an electro-magnetic machine, a drum comprising a circumferential series of parallel non-magnetic dielectric bars keyed together and magnetic segments supported by said bars.

11. In an electro-magnetic machine, a drum comprising a circumferential series of contiguous parallel bars of non-magnetic dielectric material, each bar being sector shaped in cross section magnetic segments embedded in the drum between the bars and a ring to which the ends of the bars are clamped.

12. In an electro-magnetic machine, a drum comprising a circumferential series of contiguous bars of non-magnetic dielectric material, magnetic segments embedded in the drum between the bars, a ring in which said bars are mounted, and means for preventing rotation of a bar with respect to the ring.

In testimony whereof, I have hereunto set my hand at San Francisco, California, this 13th day of January, 1920

RUDOLPH W. VAN NORDEN.

In presence of—
H. G. PROST.